US010757622B2

(12) United States Patent
Srivastava et al.

(10) Patent No.: US 10,757,622 B2
(45) Date of Patent: Aug. 25, 2020

(54) SWITCHING FROM A PRIORITY-BASED RESELECTION MECHANISM TO A RANK-BASED RESELECTION MECHANISM

(71) Applicant: QUALCOMM Incorporated, San Diego, CA (US)

(72) Inventors: Ankur Srivastava, Hyderabad (IN); Kishore Kumar Yannakula, Hyderabad (IN); Suresh Sanka, Hyderabad (IN); Ajit Gupta, Hyderabad (IN); Bhanu Kiran Janga, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/184,639

(22) Filed: Nov. 8, 2018

(65) Prior Publication Data
US 2019/0150042 A1  May 16, 2019

(30) Foreign Application Priority Data
Nov. 10, 2017 (IN) .............................. 201741040153

(51) Int. Cl.
| *H04W 36/08* | (2009.01) |
| *H04W 36/00* | (2009.01) |
| *H04W 36/14* | (2009.01) |
| *H04W 48/16* | (2009.01) |
| *H04W 36/12* | (2009.01) |

(Continued)

(52) U.S. Cl.
CPC ....... *H04W 36/08* (2013.01); *H04W 36/0061* (2013.01); *H04W 36/0079* (2018.08); *H04W 36/125* (2018.08); *H04W 36/14* (2013.01); *H04W 36/36* (2013.01); *H04W 48/16* (2013.01); *H04W 36/00837* (2018.08); *H04W 48/18* (2013.01)

(58) Field of Classification Search
CPC .. H04W 36/08; H04W 36/14; H04W 36/0079
USPC ................................................. 455/436, 411
See application file for complete search history.

(56) References Cited

U.S. PATENT DOCUMENTS

| 2015/0079988 A1* | 3/2015 | Su .......................... H04W 36/30 455/436 |
| 2016/0127956 A1 | 5/2016 | Jujaray et al. |
| 2018/0242208 A1* | 8/2018 | Ku ......................... H04W 28/08 |

FOREIGN PATENT DOCUMENTS

| EP | 2056639 A2 | 5/2009 |
| EP | 2458921 A1 | 5/2012 |
| WO | 2016064541 A1 | 4/2016 |

OTHER PUBLICATIONS

International Search Report and Written Opinion—PCT/US2018/060060—ISA/EPO—dated Jan. 9, 2019.

* cited by examiner

*Primary Examiner* — Chuck Huynh
(74) *Attorney, Agent, or Firm* — Arent Fox LLP

(57) ABSTRACT

In an aspect of the disclosure, a method, a computer-readable medium, and an apparatus are provided. The apparatus may receive a priority list associated with preferred radio frequencies from a serving base station. In certain aspects, each radio frequency of the preferred radio frequencies associated with a first set of base station may operate on a first RAT. In certain other aspects, the apparatus may determine if the UE is able to reselect to the first RAT. In certain other aspects, the apparatus may perform a rank-based cell reselection procedure based on signal strength when the UE is unable to reselect to the first RAT.

20 Claims, 8 Drawing Sheets

(51) Int. Cl.
*H04W 36/36* (2009.01)
*H04W 48/18* (2009.01)

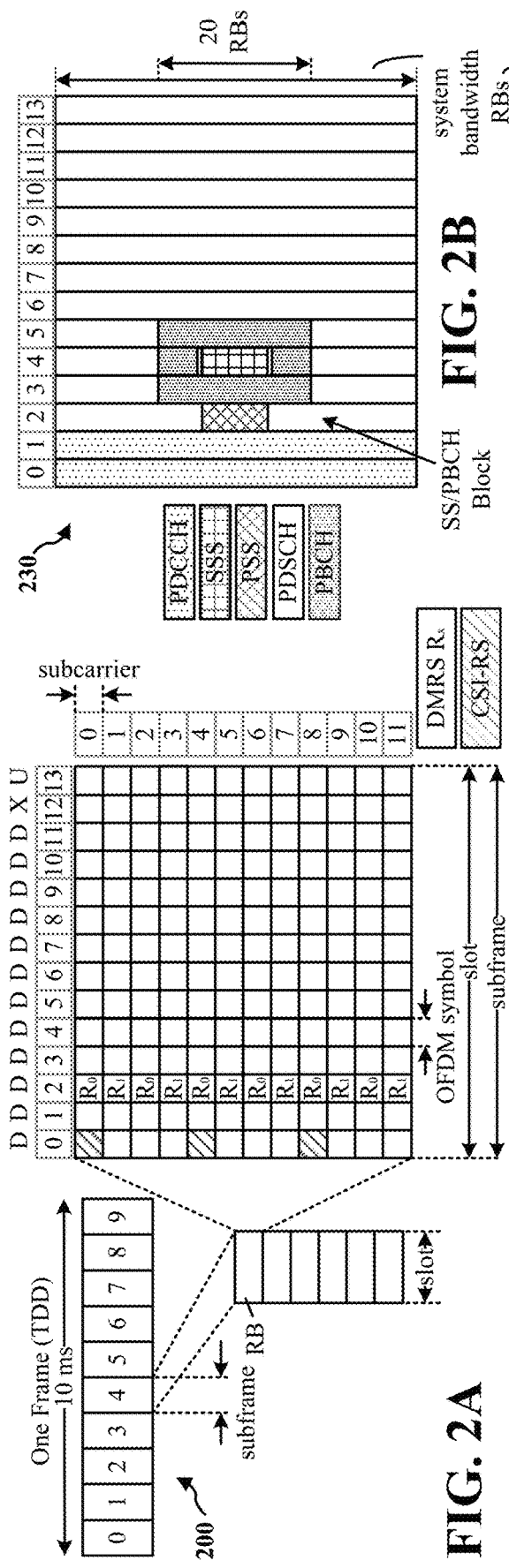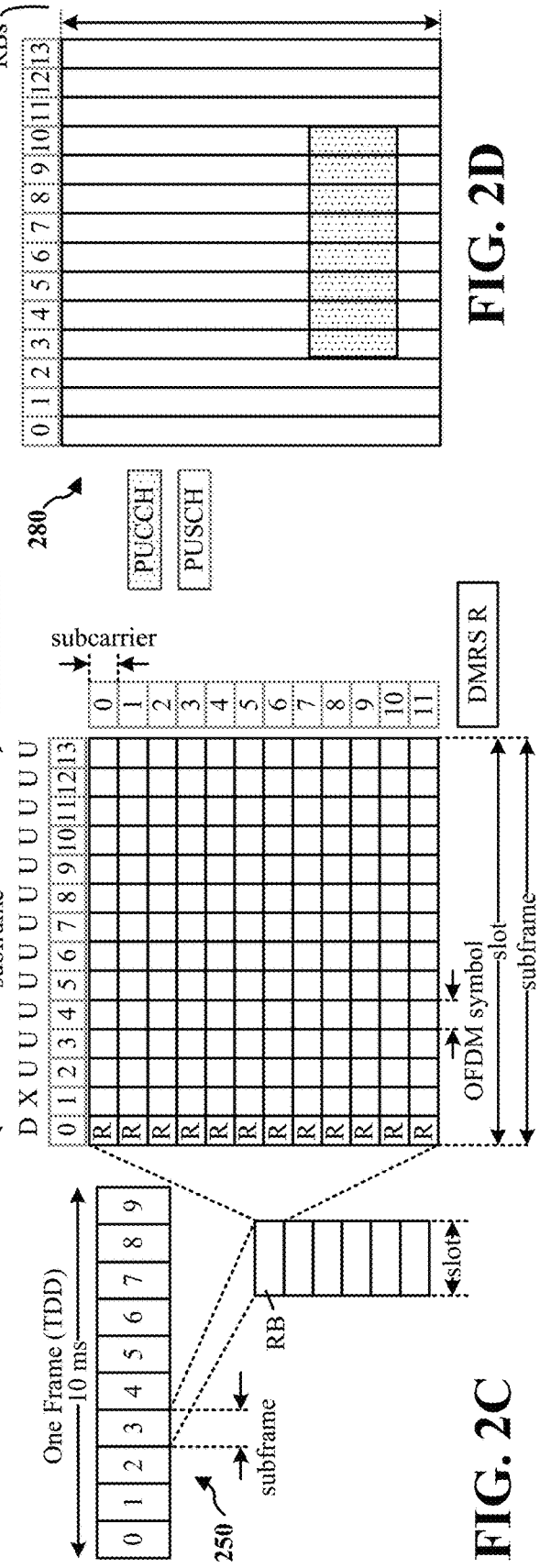

SWITCHING FROM A PRIORITY-BASED RESELECTION MECHANISM TO A RANK-BASED RESELECTION MECHANISM

CROSS-REFERENCE TO RELATED APPLICATION(S)

This application claims the benefit of Indian Patent Application No: 201741040153, entitled "SWITCHING FROM A PRIORITY-BASED RESELECTION MECHANISM TO A RANK-BASED RESELECTION MECHANISM" and filed on Nov. 10, 2017, which is expressly incorporated by reference herein in its entirety.

BACKGROUND

Technical Field

The present disclosure relates generally to communication systems, and more particularly, to a reselection mechanism for a user equipment (UE) to reselect among multiple radio access technologies (RATs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology, including a need for improved cell selection/reselection. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A radio access technology (RAT) is the underlying physical connection method for a radio based communication network. A UE may support several RATs such as 2G, 3G, 4G, and 5G, and may switch between the different RATs based on the type of RAT supported by a serving cell. A cell reselection procedure is a mechanism by which an IDLE mode UE may reselect from a serving cell to a neighbor cell. An inter-RAT (IRAT) cell reselection is a procedure by which a UE may reselect from a serving cell that supports a first type of RAT to a neighbor cell associated that supports a second type of RAT.

Cell reselection and/or IRAT cell reselection may enable a UE to connect to a neighbor cell that has an increased quality of service (e.g., a higher data rate) as compared to the serving cell. One type of cell reselection procedure is a rank-based reselection procedure. Another type of cell reselection procedure is a priority-based reselection procedure.

When rank-based reselection is enabled, information that is used to perform a rank-based reselection procedure may be communicated to the UE via a system information block (SIB). The information in the SIB may include, e.g., reselection threshold criteria used to determine whether to measure the signal strength of neighbor cells, parameters used for calculating the respective ranks of the serving cell and neighbor cells, etc.

Periodically (e.g., at the end of a discontinuous reception (DRX) cycle), the UE may measure a signal strength of the serving base station. When the signal strength of the serving cell meets the reselection threshold criteria, the UE may determine the rank of the serving cell and each of the neighbor cells based on the information received in the SIB, and may reselect to the cell with the highest rank. Due to the complexity of the signal strength measurements and the reselection threshold criteria, performing a rank-based reselection procedure may consume an undesirable amount of battery power and/or reduce the quality of service.

A priority-based reselection procedure may enable the UE to reselect to a neighbor cell that has a higher priority RAT than the serving cell. For example, 5G NR may be the highest priority RAT, 4G may be the second highest priority RAT, 3G may be the third highest priority RAT, and so on.

When priority-based cell reselection is enabled, information (e.g., a reselection priority list) used to perform the priority-based cell reselection procedure may be communicated to the UE via an SIB. The reselection priority list may prioritize one or more different radio frequencies of neighbor cells operating on a highest priority RAT. Hence, when a UE with a 5G subscriber identification module (SIM) card is camped on a 3G serving cell, the reselection priority list may include a prioritized list of radio frequencies associated with one or more 5G neighbor cells but not the radio frequencies of 4G neighbor cells. The radio frequencies may be prioritized based on system overhead, data rate, etc.

However, when 5G services are inaccessible to the UE or when the 5G neighbor cells are barred, the UE may be forced to reselect to a 3G neighbor cell instead of a 4G neighbor cell even though 4G services are accessible to the UE (e.g., because the reselection priority list did not include radio frequencies for 4G neighbor cells). Thus, there is a need for a cell reselection mechanism that enables a UE to reselect to the highest priority RAT accessible to the UE when the reselection priority list does not include the radio frequencies for a preferred RAT.

The present disclosure provides a solution to the problem by enabling the UE to perform a rank-based reselection procedure when the UE is unable to reselect to the RAT indicated in the radio frequencies of the reselection priority list.

In an aspect of the disclosure, a method, a computer-readable medium, and an apparatus are provided. The apparatus may receive a priority list associated with preferred radio frequencies from a serving base station. In certain aspects, each radio frequency of the preferred radio frequencies associated with a first set of base stations may operate on a first RAT. In certain other aspects, the apparatus may determine if the UE is able to reselect to the first RAT. In certain other aspects, the apparatus may perform a rank-based cell reselection procedure based on signal strength when the UE is unable to reselect to the first RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
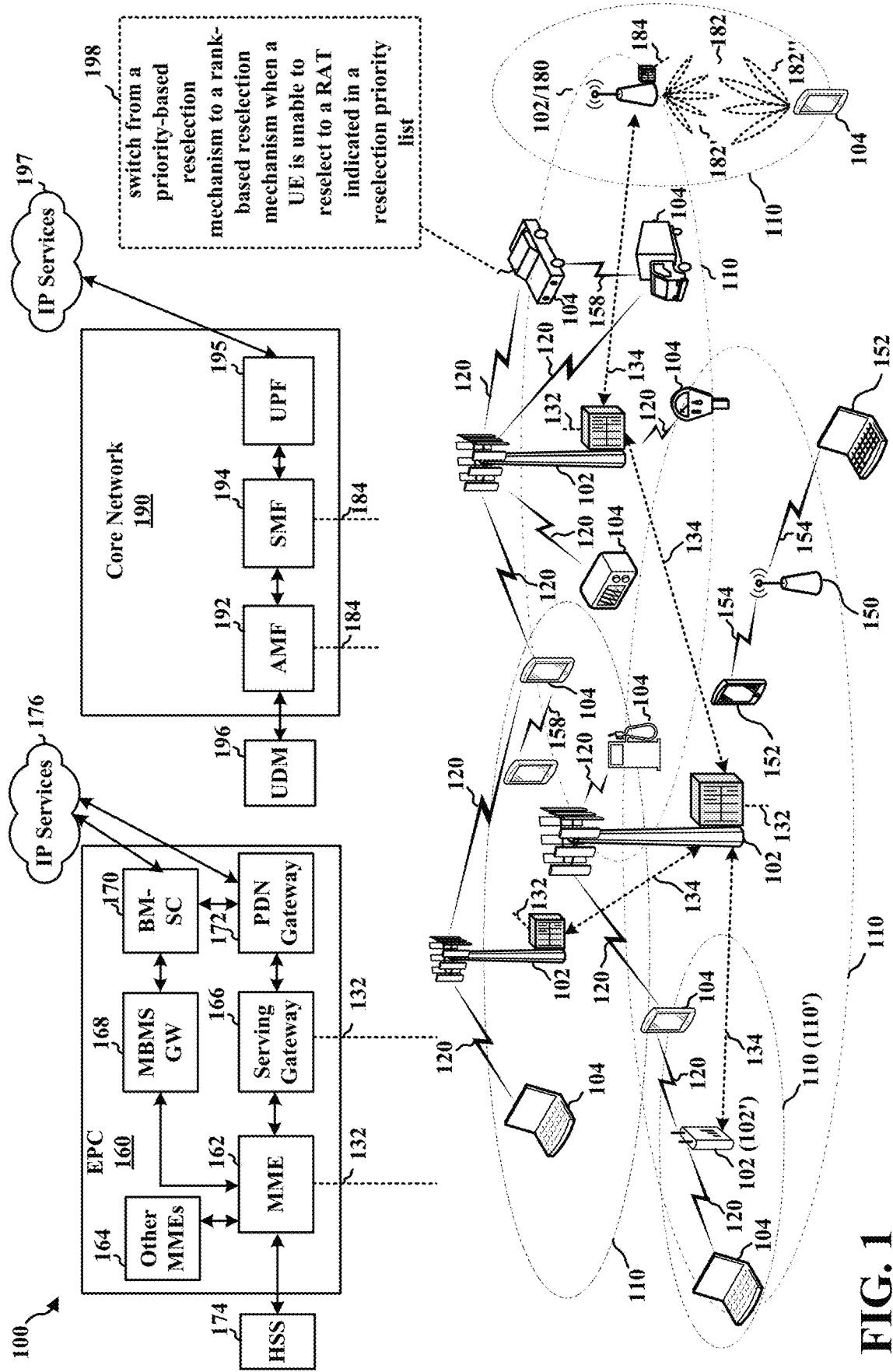
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a second Core network 190, such as a 5G core network. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) band in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has high path loss and a short range. The mmW base station 180 may utilize beamforming 182 with the UE 104 to compensate for the high path loss and short range.

The base station 180 may transmit a UE-bound beamformed signal to the UE 104 in one or more transmit directions 182'. The UE 104 may receive the UE-bound beamformed signal from the base station 180 in one or more receive directions 182". The UE 104 may also transmit a BS-bound beamformed signal to the base station 180 in one or more transmit directions. The base station 180 may receive the BS-bound beamformed signal from the UE 104 in one or more receive directions. The base station 180/UE 104 may perform beam training to determine the best receive and transmit directions for each of the base station 180/UE 104. The transmit and receive directions determined by beam training for the base station 180 may or may not be the same. The transmit and receive directions determined by beam training for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to switch from a priority-based reselection mechanism, e.g., based on a priority list, to a rank-based reselection mechanism, e.g., based on a measured signal strength, when the UE 104 is unable to reselect to a RAT indicated in a reselection priority list (198), e.g., as described below in connection with any of FIGS. 2A-7.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G/NR frame structure is illustrated as being TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference signals (RSs) for the UE (sometimes also referred to a pilot signals). The RSs may include demodulation RS (DM-RS) (indicated as $R_x$ for one particular configuration, where 100x is the port number, but other DM-RS configurations are possible) and channel state information reference signals (CSI-RS) for channel estimation at the UE. The RSs may also include beam measurement RS (BMRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
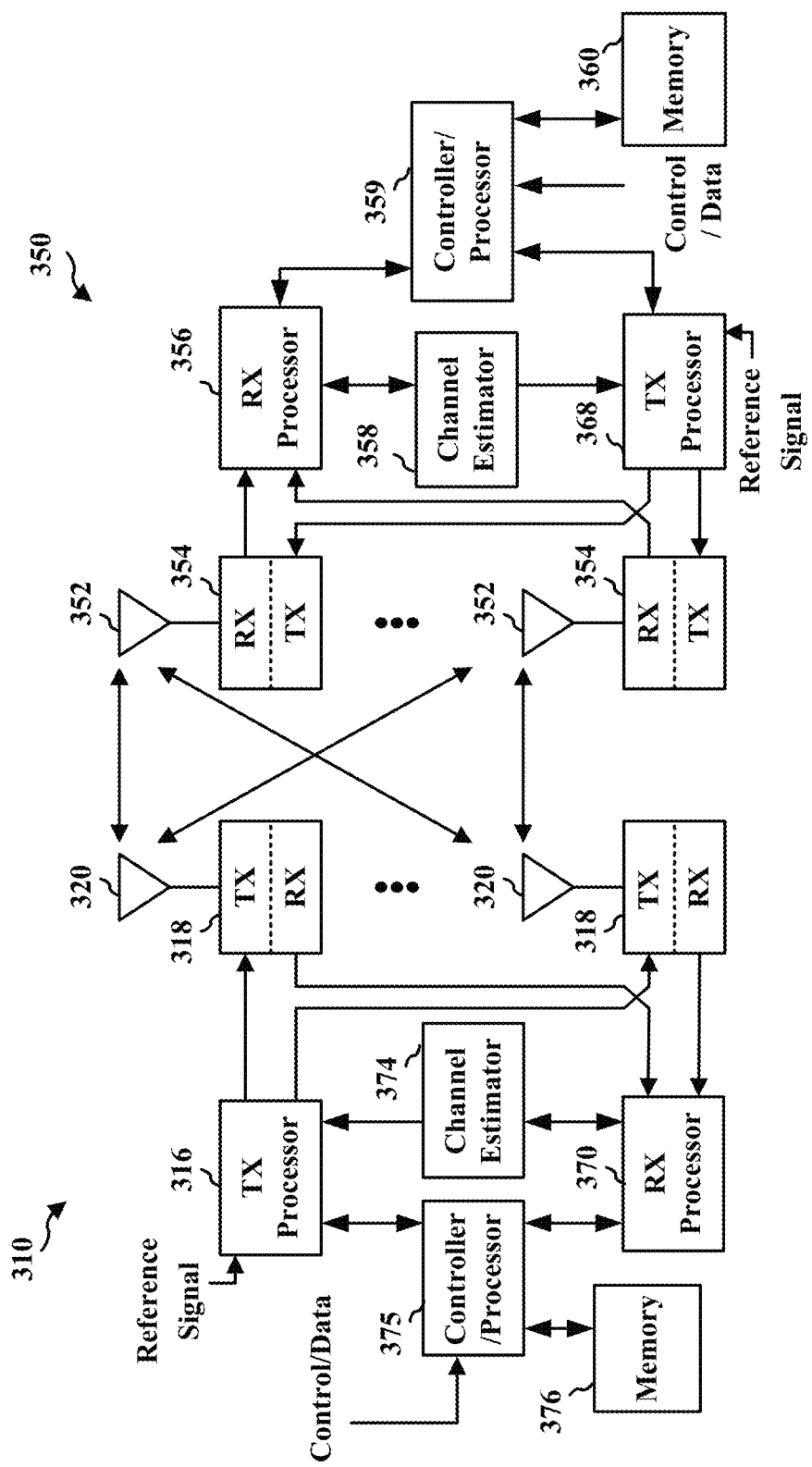
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A RAT is the underlying physical connection method for a radio-based communication network. UEs may support several RATs such as 2G, 3G, 4G, and 5G, and may switch between the different RATs based on the type of RAT supported by a serving cell. A cell reselection procedure is a mechanism by which an IDLE mode UE may reselect from a serving cell to a neighbor cell. An IRAT cell reselection is a procedure by which a UE may reselect from a serving cell that supports a first type of RAT to a neighbor cell associated that supports a second type of RAT.

Cell reselection and/or IRAT cell reselection may enable a UE to connect to a neighbor cell that has an increased quality of service (e.g., a higher data rate) as compared to the serving cell. One type of cell reselection procedure is a rank-based reselection procedure. Another type of cell reselection procedure is a priority-based reselection procedure.

When rank-based reselection is enabled, information that is used to perform a rank-based reselection procedure may be communicated to the UE via an SIB. The information in the SIB may include, e.g., reselection threshold criteria used to determine whether to measure the signal strength of neighbor cells, parameters used for calculating the respective ranks of the serving cell and neighbor cells, etc.

Periodically (e.g., at the end of a DRX cycle), the UE may measure a signal strength of the serving base station. When the signal strength of the serving cell meets the reselection threshold criteria, the UE may determine the rank of the serving cell and each of the neighbor cells based on the information received in the SIB, and reselect to the cell with the highest rank. Due to the complexity of the signal strength measurements and the reselection threshold criteria, performing a rank-based reselection procedure may consume an undesirable amount of battery power and/or reduce the quality of service.

A priority-based reselection procedure may enable the UE to reselect to a neighbor cell that has a higher priority RAT than the serving cell. For example, 5G NR may be the highest priority RAT, 4G may be the second highest priority RAT, 3G may be the third highest priority RAT, and so on.

When priority-based cell reselection is enabled, information (e.g., a reselection priority list) used to perform the priority-based cell reselection procedure may be communicated to the UE via a SIB. The reselection priority list may prioritize one or more different radio frequencies associated with neighbor cells operating on the highest priority RAT. Hence, when a UE with a 5G SIM card is camped on a 3G serving cell, the reselection priority list may include a prioritized list radio frequencies associated with one or more 5G neighbor cells but not the radio frequencies of 4G neighbor cells. The radio frequencies may be prioritized based on system overhead, data rate, etc.

However, when 5G services are inaccessible to the UE or when the 5G neighbor cells are barred, the UE may be forced to reselect to a 3G neighbor cell instead of a 4G neighbor cell even though 4G services are accessible to the UE (e.g., because the reselection priority list did not include radio frequencies for 4G neighbor cells). Thus, there is a need for a cell reselection mechanism that enables a UE to reselect to the highest priority RAT accessible to the UE when the reselection priority list does not include the radio frequencies for a preferred RAT.

The present disclosure provides a solution to the problem by enabling the UE to perform a rank-based reselection procedure when the UE is unable to reselect to the RAT indicated in the radio frequencies of the reselection priority list.

Figure 4A:
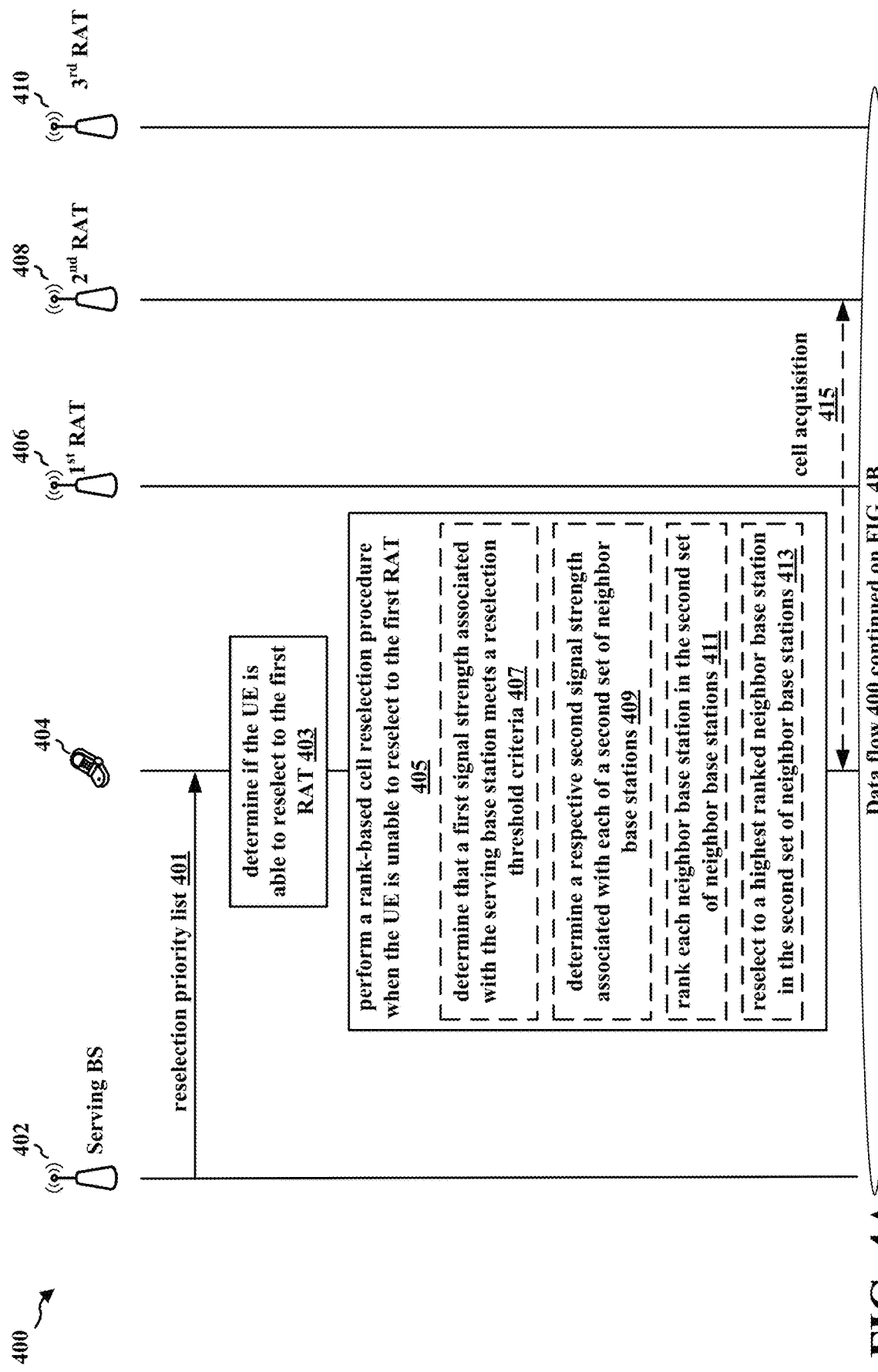
FIGS. 4A and 4B illustrate a data flow for switching from a priority-based reselection mechanism to a rank-based reselection mechanism when a UE is unable to reselect to a RAT indicated in a reselection priority list in accordance with certain aspects of the disclosure.
Figure 4B:
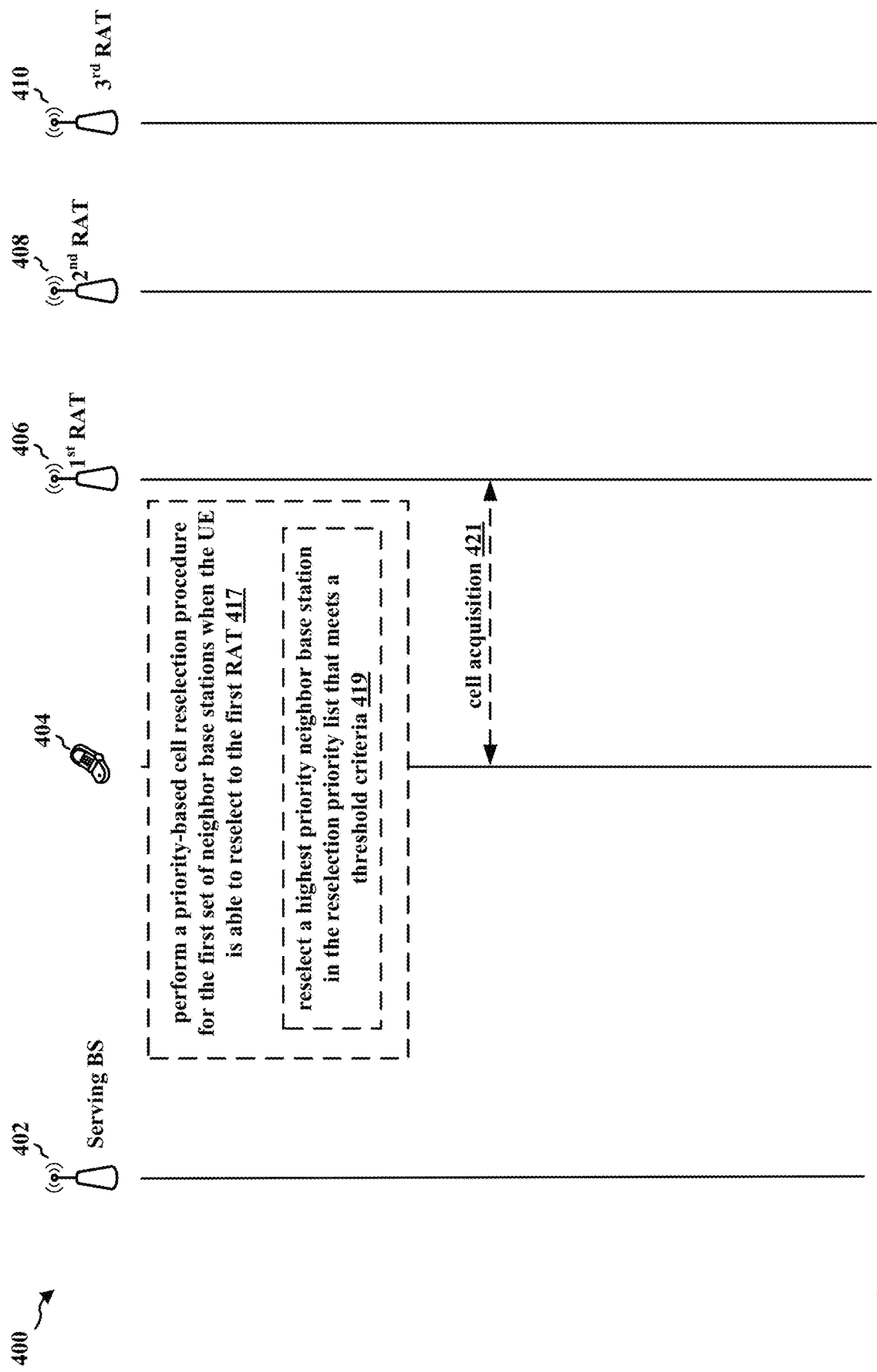

FIGS. 4A and 4B illustrate a data flow 400 that may be used to switch from a priority-based reselection mechanism to a rank-based reselection mechanism when a UE is unable to reselect to a RAT indicated in a reselection priority list in accordance with certain aspects of the disclosure. In certain implementations, the data flow 400 may enable the UE 404 to reselect from the serving base station 402 (e.g., serving cell) to one of a first neighbor base station 406 operating on a first RAT, a second neighbor base station 408 operating on a second RAT, and/or a third neighbor base station 410 operating on a third RAT. At least one of the first, second, and/or third RATs may the same as the RAT on which the serving base station operates.

The UE 404 may correspond to, e.g., the UE 104, 350, the apparatus 602/602'. The serving base station 402 may correspond to, e.g., the base station 102, 180, 310, the serving base station 650. The first neighbor base station 406 may correspond to, e.g., the base station 102, 180, 310, neighbor base station 660. The second neighbor base station 408 may correspond to, e.g., the base station 102, 180, 310, neighbor base station 655. The third neighbor base station 410 may correspond to, e.g., the base station 102, 180, 310. In FIGS. 4A and 4B, optional operations are indicated with dashed lines.

Referring to FIG. 4A, the UE 404 may receive (at 401) a reselection priority list associated with preferred radio frequencies from the serving base station 402. In certain aspects, each radio frequency of the preferred radio frequencies is associated with a first set of base stations operating on a first RAT. In certain other aspects, the first RAT may be the highest priority RAT associated with the UE 404. For example, 5G NR may be the highest priority RAT, 4G may be the second highest priority RAT, 3G may be the third highest priority RAT, and so on. Hence, when the UE 404 has a 5G SIM card, 5G may be highest priority RAT associated with the UE 404. However, when the UE 404 has a 4G SIM card and not a 5G SIM card, 4G may be the highest priority RAT associated with the UE 404, and so on. In the example illustrated in FIGS. 4A and 4B, the first set of neighbor base stations may include the first neighbor base station 406.

The UE 404 may use the reselection priority list to scan for a base station to reselect to and/or acquire when the UE 404 performs a power-up, or in response to a radio link failure.

In certain configurations, the UE 404 may determine (at 403) whether the UE is able to reselect to the first RAT (e.g., the first neighbor base station 406). For example, the UE 404 may determine (at 403) that the UE 404 is able to reselect to the first RAT when the UE 404 is subscribed for first RAT services and when the neighbor cells operating on the first RAT are unbarred. Otherwise, the UE 404 may determine (at 403) that the UE is unable to reselect to the first RAT when the UE is unsubscribed for first RAT services and/or when the neighbor cells associated with the first RAT are barred.

When the UE 404 determines (at 403) that the UE 404 is unable to reselect to the first RAT, the operation continues at 405 in FIG. 4A. Otherwise, when the UE 404 determines (at 403) that the UE is able to reselect to the first RAT, the operation continues at 417 in FIG. 4B.

Still referring to FIG. 4A, the UE 404 may perform (at 405) a rank-based cell reselection procedure based on signal strength when the UE 404 is unable to reselect to the first RAT (e.g., the first neighbor base station 406). Thus, the UE may perform reselection using different mechanisms, e.g., priority-based reselection or rank-based reselection, based on whether the UE is able to reselect to a cell operating on a particular RAT, e.g., a most desired RAT, a same RAT as a serving cell, etc. In certain configurations, the UE 404 may perform the rank-based cell reselection procedure by determining (at 407) that a first signal strength associated with the serving base station meets a reselection threshold criteria.

For example, an IDLE mode UE 404 may enter a wake mode of every DRX cycle to measure the signal of the serving base station 402 ($Q_{meas,s}$) and determine (at 407) the received signal level ($S_{rxlev}$) of the serving base station 402. Based on the received signal level ($S_{rxlev}$), the UE 404 may determine whether to remain camped on the serving cell (e.g., the serving base station 402) or whether to reselect to a neighbor base station. Here, the transmission and reception conditions the UE 404 may be reflected in the determination (at 407), for example, by applying minimum received signal level ($Q_{rxlevmin}$), allowed maximum TX power level $P_{EMAX}$, etc. If the received signal level ($S_{rxlev}$) of the serving base station 402 is greater than or equal to the specified threshold value (s-IntraSearch), the UE 404 may remain camped on the serving cell (e.g., the serving base station 402). Otherwise, the operation may continue to perform rank-based reselection procedure based on signal strength at 409.

In certain other configurations, the UE 404 may perform the rank-based reselection procedure by determining (at 409) a respective second signal strength ($Q_{meas,n}$) associated with each of a second set of neighbor base stations 408, 410 upon determining (at 407) that the first signal strength ($S_{rxlev}$) meets the reselection threshold criteria (e.g., is less than s-IntraSearch). In certain aspects, the second set of neighbor base stations 408, 410, etc. may be different than the first set of neighbor base stations, e.g., including base station 406.

In certain other configurations, the UE 404 may perform the rank-based reselection procedure by ranking (at 411) each neighbor base station 408, 410 in the second set of neighbor base stations based on the respective second signal strength for each neighbor base station. For example, the UE 404 may rank each cell ($R_s$, $R_n$) based on the measured signal strength of the serving cell ($Q_{meas,s}$) and neighbor cells ($Q_{meas,n}$), where $R_s$ is the rank of the serving cell and $R_n$ is the rank of a particular neighbor cell. Parameters used for cell ranking may be communicated to the UE 404 through, e.g., SIBs 3 and 4 from the serving base station 402. The serving base station 402 may be ranked using the hysteresis (q-Hyst) value included in a SIB, e.g., SIB 3, while the neighbor base stations 408, 410 may be ranked-based on the offset (q-OffsetCell) value specified for each cell in another SIB, e.g., SIB 4.

Once the serving base station 402 and each neighbor base station in the second set of neighbor base stations 408, 410 are ranked (at 411), the UE 404 may determine if the cell reselection criterion is satisfied ($R_n$>$R_s$). Upon determining that one or more neighbor base stations 408, 410 satisfy the cell reselection criterion, the UE 404 may perform the rank-based reselection procedure by reselecting (at 413) to a highest ranked neighbor base station in the second set of neighbor base stations 408, 410. In certain aspects the highest ranked neighbor base station 408 may be operating on a RAT different from the RAT on which the serving base station 402 operates. For example, the highest ranked neighbor base station may be operating on a second RAT. The second RAT may be the second highest priority RAT associated with the UE 404. For example, if the UE 404 has a 5G SIM card but either is unsubscribed for 5G services and/or the 5G neighbor cell (e.g., first neighbor base station 406) is barred, a selection/reselection to a 5G cell would fail. If the UE relies on a priority-based reselection even when selection among cells of the highest priority RAT has failed, the UE may select a less desirable base station. For example, if there are no priorities for 4G cells, the UE may select a 3G cell even when a 4G cell was possible. By using the rank-based reselection mechanism described above, the UE 404 may be able to reselect to a more desirable RAT (e.g., second neighbor base station 408 associated with the second RAT) instead of reselecting to a base station with a less desirable RAT that has available priority information, e.g., to less desired RAT neighbor base station 410. In certain configurations, the UE 404 may perform (at 415) cell acquisition of the second neighbor base station 408 operating on the second RAT.

Referring to FIG. 4B, the UE 404 may perform (at 417) a priority-based cell reselection procedure for the first set of neighbor base stations 406 when the UE is able to reselect to the first RAT. For example, the UE 404 may perform the priority-based cell reselection procedure by reselecting (at 419) to a highest priority base station operating on the preferred radio frequencies that meets a threshold criteria. In one aspect the highest priority base station may be operating on the first RAT. The reselection priority list may prioritize one or more radio frequencies associated with different neighbor cells operating on the highest priority RAT (e.g., a preferred RAT) associated with the UE 404.

Hence, when the UE 404 includes a 5G SIM card and is camped on a 3G serving base station 402, the reselection priority list may include a prioritized list of 5G neighbor base station(s) 406 but not 4G neighbor base station(s) 408. The 5G neighbor cells may be prioritized based on system overhead, data rate, etc. The threshold criteria associated with the neighbor base stations prioritized in the reselection priority list may be a minimum signal strength. In other words, the UE 404 may reselect to the highest priority neighbor cell included in the list that also meets the minimum signal strength.

In certain configurations, the UE 404 may perform (at 421) cell acquisition of the first neighbor base station 406 operating on the first RAT when the first neighbor base station 406 is the highest priority neighbor base station in the reselection priority list that meets the threshold criteria.

Thus, using the mechanism described above in connection with FIGS. 4A and 4B, UE 404 may perform a rank-based reselection procedure when the UE is unable to reselect to the RAT indicated in the reselection priority list and when the UE is camped on a less desired RAT (e.g., a cell using 3G whereas base stations 406, 408 operate using 4G). The rank-based reselection may enable the UE to reselect to a neighbor cell operating on a more desirable RAT (e.g., $2^{nd}$ RAT) associated with the UE 404, rather than to neighbor cell 410 operating on a less desirable RAT, even when priority-based reselection would lead the UE to select a cell of the less desirable RAT. The rank-based reselection may be RAT independent so that the UE is able to select among based stations operating using different RATs. In one example, the most desired RAT may be 5G, the second most desirable RAT may be 4G, and the less desirable RAT may be 3G. In another example, the most desired RAT may be 4G, the second most desirable RAT may be 3G, and the less desirable RAT may be 2G.

Figure 5:
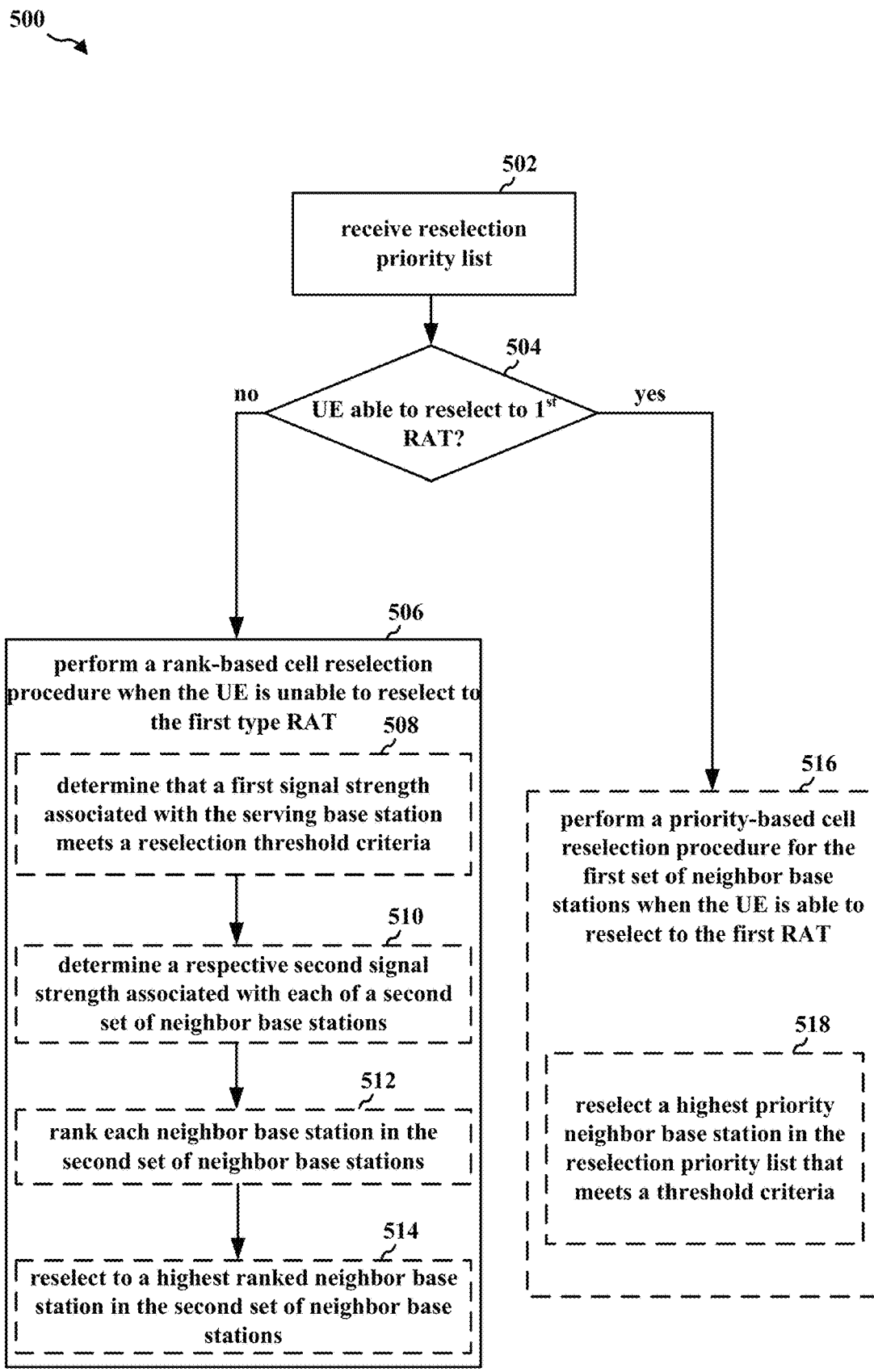
FIG. 5 is a flowchart of a method of wireless communication.

FIG. 5 is a flowchart 500 of a method of wireless communication. The method may be performed by a UE (e.g., the UE 104, 350, 404, the apparatus 602/602'). In FIG. 5, optional operations are indicated with dashed lines.

At 502, the UE may receive a priority list associated with preferred radio frequencies from a serving base station. In certain aspects, each radio frequency of the preferred radio frequencies associated with a first set of base stations operating on a first RAT. In certain other aspects, the serving base station may be operating on a RAT that has a lower priority or is less desirable for the UE than the first RAT. For example, referring to FIG. 4A, the UE 404 may receive (at 401) a reselection priority list associated with preferred radio frequencies from the serving base station 402. In the example of FIG. 4A, the serving base station was operates on a different RAT than the first set of base stations operating on the first RAT. In certain aspects, each radio frequency of the preferred radio frequencies associated with a first set of base station may be associated with a first RAT. In certain other aspects, the first RAT may be the highest priority, most preferred, most recent technology, RAT associated with the UE 404. For example, 5G NR may be the preferred RAT, 4G may be the next preference for a RAT, 3G may be priority less preferred RAT, and so on. Hence, when the UE 404 has a 5G SIM card, 5G may be priority most preferred RAT associated with the UE 404. However, when the UE 404 has a 4G SIM card and not a 5G SIM card, 4G may be the most preferred RAT associated with the UE 404, and so on. In the example illustrated in FIGS. 4A and 4B, the first set of neighbor base stations may be the first neighbor base station 406.

At 504, the UE may determine if the UE is able to reselect to the first RAT. For example, the UE 404 may determine (at 403) whether the UE is able to reselect to the first RAT. For example, the UE 404 may determine (at 403) that the UE is able to reselect to the first RAT when the UE is subscribed to first RAT services and when the neighbor cells operating on the first RAT are unbarred. Otherwise, the UE 404 may determine (at 403) that the UE is unable to reselect to the first RAT when the UE is unsubscribed for first RAT services and/or when the neighbor cells operating on the first RAT are barred.

Upon determining (at 504) that the UE is unable to reselect to the first RAT, the operation continues at 506. Otherwise, upon determining (at 504) that the UE is able to reselect to the first RAT, the operation continues at 516.

At 506, the UE may perform a rank-based cell reselection procedure based on signal strength when the UE is unable to reselect to the first RAT. For example, referring to FIG. 4A, the UE 404 may perform (at 405) a rank-based cell reselection procedure when the UE 404 is unable to reselect to the first RAT. The rank-based reselection may be performed in a RAT independent manner so that the UE may select between base stations operating on different RATs.

At 508, the UE may perform the rank-based cell reselection procedure by determining that a first signal strength associated with the serving base station meets a reselection threshold criteria. For example, referring to FIG. 4A, the UE 404 may perform the rank-based cell reselection procedure by determining (at 407) that a first signal strength associated with the serving base station meets a reselection threshold criteria. For the rank-based reselection procedure, an IDLE mode UE 404 may enter a wake mode of every DRX cycle to measure the signal of the serving base station 402 ($Q_{meas,s}$) and determine (at 407) the received signal level ($S_{rxlev}$) of the serving base station 402 to determine whether to remain camped on the serving cell (e.g., the serving base station 402) or to reselect to a neighbor cell. Here, the transmission and reception conditions the UE 404 may be reflected in the determination (at 407), for example, by applying minimum received signal level ($Q_{rxlevmin}$), allowed maximum TX power level $P_{EMAX}$, etc. If the received signal level ($S_{rxlev}$) of the serving base station 402 is greater than or equal to the specified threshold value (s-IntraSearch), the UE 404 may remain camped on the serving cell. Otherwise, the UE 404 determines (at 407) that the signal strength of the serving base station 402 is less than the specified threshold value (s-IntraSearch).

At 510, the UE may perform the rank-based cell reselection procedure by determining a respective second signal strength associated with each of a second set of neighbor base stations upon determining that the first signal strength meets the reselection threshold criteria. In certain aspects, the second set of neighbor base stations may be different than the first set of neighbor base stations. For example, referring to FIG. 4A, the UE 404 may perform the rank-based reselection procedure by determining (at 409) a respective second signal strength ($Q_{meas,n}$) associated with each of a second set of neighbor base stations 408, 410 upon determining (at 407) that the first signal strength meets the reselection threshold criteria. In certain aspects, the second set of neighbor base stations 408, 410 may be different than the first set of neighbor base stations 406.

At 512, the UE may perform the rank-based cell reselection procedure by ranking each neighbor base station in the second set of neighbor base stations based on the respective second signal strength for each neighbor base station. For example, referring to FIG. 4A, the UE 404 may perform the rank-based reselection procedure by ranking (at 411) each neighbor base station 408, 410 in the second set of neighbor base stations based on the respective second signal strength for each neighbor base station. For example, the UE 404 may rank each cell ($R_s$, $R_n$) based on the measured signal strength of the serving cell ($Q_{meas,s}$) and neighbor cells ($Q_{meas,n}$). Parameters used for cell ranking may be communicated to the UE 404 through, e.g., SIBs 3 and 4 from the serving base station 402. The serving base station 402 may be ranked using the hysteresis (q-Hyst) value included in SIB 3 while the neighbor base stations 408, 410 may be ranked based on the offset (q-OffsetCell) value specified for each cell in SIB 4. Once the serving base station 402 and each neighbor base station in the second set of neighbor base stations 408, 410 are ranked (at 411), the UE 404 may determine if the cell reselection criterion is satisfied ($R_n > R_s$).

At 514, the UE may perform the rank-based cell reselection procedure by reselecting to a highest ranked neighbor base station in the second set of neighbor base stations. For example, referring to FIG. 4A, upon determining that one or more neighbor base stations 408, 410 satisfy the cell reselection criterion, the UE 404 may perform the rank-based reselection procedure by reselecting (at 413) to a highest ranked neighbor base station in the second set of neighbor base stations. In certain aspects the highest ranked neighbor base station 408 may be operating on, for example, a second RAT that is different than the first RAT. The second RAT may be the second highest priority RAT associated with the UE 404. For example, if the UE 404 is associated with 5G but either is unsubscribed for 5G services or the 5G neighbor cell (e.g., first neighbor base station 406) is barred, by using the rank-based reselection mechanism, the UE 404 may be able to reselect to the second highest priority RAT instead of having to reselect to the $3^{rd}$ RAT neighbor base station 410 for the reasons discussed above.

At 516, the UE may perform a priority-based cell reselection procedure for the first set of neighbor base stations, instead of the rank-based priority reselection based on signal strength, when the UE is able to reselect to the first RAT. For example, referring to FIG. 4B, the UE 404 may perform (at 417) the priority-based cell reselection procedure for the first set of neighbor base stations when the UE is able to reselect to the first RAT.

At 518, the UE may perform the priority-based cell reselection procedure by reselecting (e.g., as described in connection with 413 in FIG. 4) to a highest priority base station operating on the preferred radio frequencies that meets a threshold criteria. In one aspect the highest priority base station may be operating on the first of RAT. For example, the UE 404 may perform the priority-based cell reselection procedure by reselecting (at 419) to a highest priority base station operating on the preferred radio frequencies that meets a threshold criteria. In one aspect the highest priority base station may be operating on the first of RAT. The reselection priority list may prioritize one or more different neighbor cells operating on the highest priority RAT in the area. Hence, when the UE 404 includes a 5G SIM card is camped on a 3G serving base station 402, the reselection priority list may include a prioritized list of 5G neighbor base station(s) 406 but not 4G neighbor base stations 408. The 5G neighbor cells may be prioritized based on system overhead, data rate, etc. The threshold criteria associated with the neighbor base stations prioritized in the reselection priority list may be a minimum signal strength.

Thus, using the mechanism described above in connection with FIG. 5, a UE of the present disclosure may perform a rank-based reselection procedure based on signal strength when the UE is unable to reselect to the RAT indicated in the reselection priority list and is camped on a lower priority RAT (e.g., $3^{rd}$ RAT), thereby reselecting to a second highest priority RAT (e.g., $2^{nd}$ RAT) associated with the UE, rather than a third highest priority RAT (e.g., $3^{rd}$ RAT)) neighbor cell. For example, when the highest priority RAT is 5G (e.g., $1^{st}$ RAT), the second highest priority RAT may be 4G (e.g., $2^{nd}$ RAT), and the third highest priority RAT may be 3G (e.g., $3^{rd}$ RAT). In another example, when the highest priority RAT is 4G (e.g., $1^{st}$ RAT), the second highest priority RAT may be 3G (e.g., $2^{nd}$ RAT), and the third highest priority RAT may be 2G (e.g., $3^{rd}$ RAT).

Figure 6:
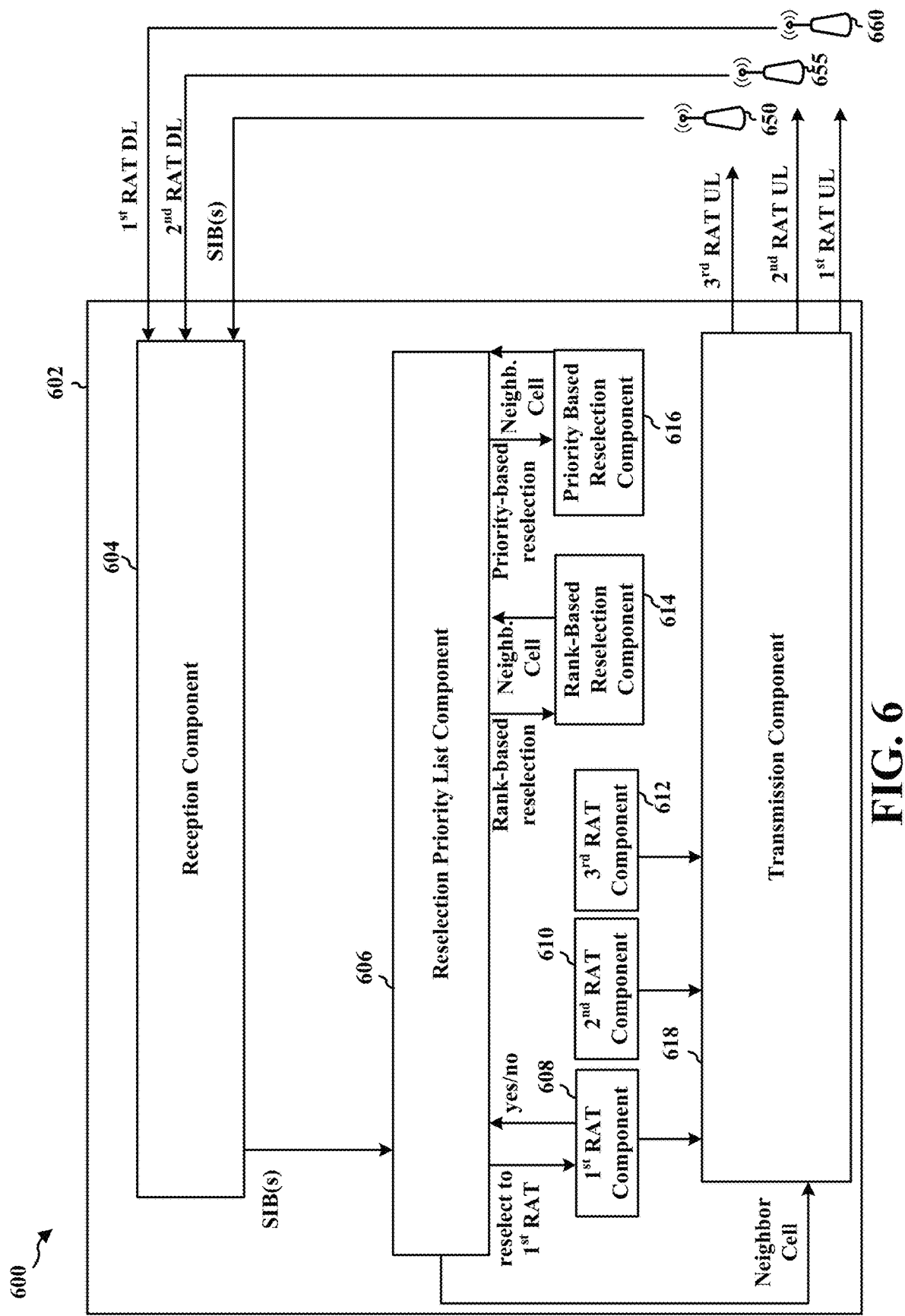
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a UE (e.g., the UE 104, 350, 404, the apparatus 602') in communication with a serving base station 650 (e.g., the base station 102, 180, 310, the serving base station 402), a neighbor base station 655 (e.g., the base station 102, 180, 310, the second neighbor base station 408), and/or a second neighbor base station 660 (e.g., the base station 102, 180, 310, the first neighbor base station 406).

The apparatus may include a reception component 604, a reselection priority list component 606, a first RAT component 608, a second RAT component 610, a third RAT component 612, a rank-based reselection component 614, a priority-based reselection component 616, and a transmission component 618.

In certain configurations, the first RAT component 608 may be configured to maintain information related to any first RAT services the apparatus is subscribed for, and information indicating whether any neighbor cells operating on the first RAT are barred. In certain other configurations, the second RAT component 610 may be configured to maintain information related to any second RAT services the apparatus is subscribed for, and information indicating whether any neighbor cells operating on the second RAT are barred. In certain other configurations, the third RAT component 612 may be configured to maintain information related to any third RAT services the apparatus is subscribed for, and information indicating whether any neighbor cells operating on the third RAT are barred.

The reception component 604 may be configured to receive a priority list associated with preferred radio frequencies from a serving base station. In certain aspects, each radio frequency of the preferred radio frequencies associated with a first set of base station may operate on a first RAT. In certain aspects, the reselection priority list may be received in a SIB from the serving base station. In certain other aspects, the serving base station may be operating on a RAT that has a lower priority than the first RAT. In certain configurations, the reception component 604 may be configured to send a signal associated with the SIB(s) and/or reselection priority list to the reselection priority list component 606. The reselection priority list component 606 may determine the RAT (e.g., $1^{st}$ RAT, $2^{nd}$ RAT, $3^{rd}$ RAT) with which the prioritized neighbor cells listed in the reselection priority list are associated. The reselection priority list component 606 may be configured to send a signal to the first RAT component 608 when the neighbor cells in the reselection prioritized list are operating on the first RAT. The first RAT component 608 may be configured to determine if the UE is able to reselect to the first RAT. The first RAT component 608 may be configured to send a signal to indicate whether the UE is able to reselect to the first RAT to one or more of the reselection priority list component 606, the rank-based reselection component 614, and/or the priority-based reselection component 616.

When the signal indicates that the UE is not able to reselect to the first RAT, the rank-based reselection component 614 may be configured to perform a rank-based cell reselection procedure based on signal strength when the UE is unable to reselect to the first RAT. In certain aspects, the rank-based reselection component 614 may be configured to perform the rank-based cell reselection procedure by determining that a first signal strength associated with the serving base station meets a reselection threshold criteria. In certain other aspects, the rank-based reselection component 614 may be configured to perform the rank-based cell reselection procedure by determining a respective second signal strength associated with each of a second set of neighbor base stations upon determining that the first signal strength meets the reselection threshold criteria. In certain aspects, the second set of neighbor base stations may be different than the first set of neighbor base stations. In certain other aspects, the rank-based reselection component 614 may be configured to perform the rank-based cell reselection procedure by ranking each neighbor base station in the second set of neighbor base stations based on the respective second signal strength for each neighbor base station. In certain other aspects, the rank-based reselection component 614 may be configured to perform the rank-based cell reselection procedure by reselecting to a highest ranked neighbor base station in the second set of neighbor base stations, the highest ranked neighbor base station operating on a second RAT, e.g., different than the first RAT. The rank-based reselection may be performed in a RAT independent manner so that the UE may select between base stations operating on different RATs. The rank-based reselection component 614 may be configured to send a signal to one or more of the second RAT component 610, the reception component 604, the transmission component 618, and/or the reselection priority list component 606 indicating the neighbor base station 655 (e.g., $2^{nd}$ RAT) for which reselection was determined. The transmission component 618 and/or reception component 604 may be configured to perform a cell acquisition procedure with the neighbor base station 655 to acquire the first neighbor cell.

When the signal indicates that the UE is able to reselect to the first RAT, the priority-based reselection component 616 may be configured to perform a priority-based cell reselection procedure for the first set of neighbor base stations when the UE is able to reselect to the first RAT. In certain aspects, the priority-based reselection component 616 may be configured to perform the priority-based cell reselection procedure by reselecting to a highest priority base station operating on the preferred radio frequencies that meets a threshold criteria. In one aspect the highest priority base station operates on the first of RAT. The priority-based reselection component 616 may be configured to send a signal to one or more of the first RAT component 608, the reception component 604, the transmission component 618, and/or the reselection priority list component 606 indicating neighbor base station 660 (e.g., $1^{st}$ RAT) for which reselection was determined. The transmission component 618 and/or reception component 604 may be configured to perform a cell acquisition procedure with the neighbor base station 660 to acquire the second neighbor cell.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium, e.g., a non-transitory computer-readable medium, for implementation by a processor, or some combination thereof.

Figure 7:
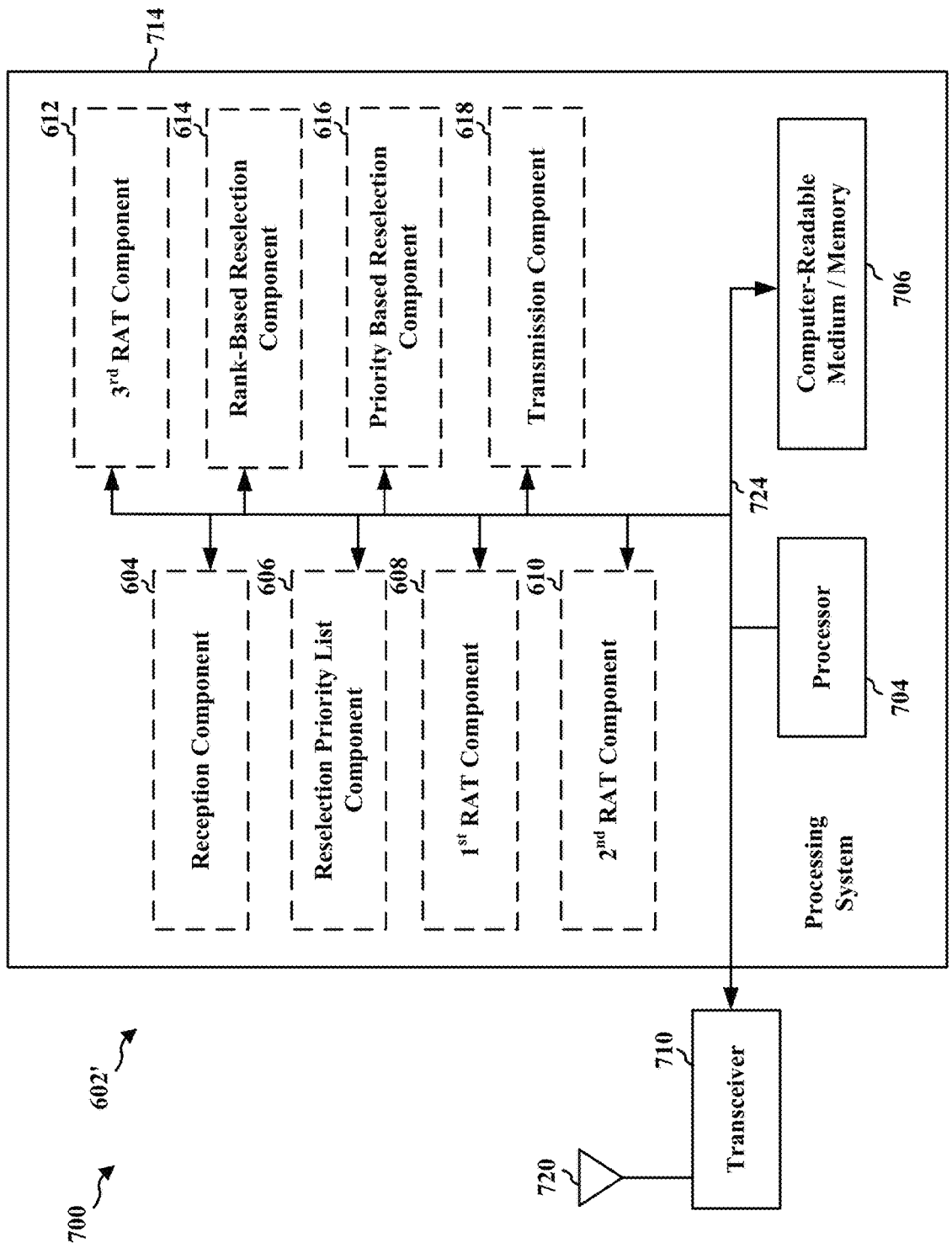
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616, 618 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 618, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, instructs the processing system 714 to perform the various functions described supra for any particular apparatus, e.g., based on aspects described in connection with the flowcharts in FIGS. 4A, 4B, and/or 5. The computer-readable medium/memory 706 may also be used for storing data that is manipulated by the processor 704 when executing software. The processing system 714 further includes at least one of the components 604, 606, 608, 610, 612, 614, 616, 618. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In certain configurations, the apparatus 602/602' for wireless communication may include means for receive a priority list associated with preferred radio frequencies from a serving base station (e.g., at least reception component, processor 704, and or memory 706). In certain aspects, each radio frequency of the preferred radio frequencies associated with a first set of base station may operate on a first RAT. In certain other aspects, the reselection priority list may be received in a SIB from the serving base station. In certain other aspects, the serving base station may be operating on a RAT that has a lower priority than the first RAT. In certain other configurations, the apparatus 602/602' for wireless communication may include means for determining if the UE is able to reselect to the first RAT (e.g., at least first RAT component 608, processor 704, and or memory 706). In certain other configurations, the apparatus 602/602' for wireless communication may include means for perform a rank-based cell reselection procedure based on signal strength when the UE is unable to reselect to the first RAT (e.g., at least reselection component 614, processor 704, and or memory 706). In certain aspects, the means for performing the rank-based cell reselection procedure may be configured to determine that a first signal strength associated with the serving base station meets a reselection threshold criteria. In certain other aspects, the means for performing the rank-based cell reselection procedure may be configured to determine a respective second signal strength associated with each of a second set of neighbor base stations upon determining that the first signal strength meets the reselection threshold criteria. In certain aspects, the second set of neighbor base stations may be different than the first set of neighbor base stations. In certain other aspects, the means for performing the rank-based cell reselection procedure may be configured to rank each neighbor base station in the second set of neighbor base stations based on the respective second signal strength for each neighbor base station. In certain other aspects, the means for performing the rank-based cell reselection procedure may be configured to reselect to a highest ranked neighbor base station in the second set of neighbor base stations, the highest ranked neighbor base station operating on a second RAT different from the first RAT. In certain other configurations, the apparatus 602/602' for wireless communication may include means for performing a priority-based cell reselection procedure for the first set of neighbor base stations when the UE is able to reselect to the first RAT. In certain aspects, the means for performing the priority-based cell reselection procedure may be configured to reselect to a highest priority base station operating on the preferred radio frequencies that meets a threshold criteria. In one aspect the highest priority base station may be operating on the first of RAT. The aforementioned means may be one or more of the aforementioned components of the apparatus 602 and/or the processing system 714 of the apparatus 602' configured to perform the functions recited by the afore mentioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    receiving a priority list associated with preferred radio frequencies from a serving base station, each radio frequency of the preferred radio frequencies associated with a first set of neighbor base stations operating on a first radio access technology (RAT);
    determining if the UE is able to reselect to the first RAT;
    selecting between different inter-RAT (IRAT) cell reselection mechanisms based on whether the UE is able to reselect to the first RAT, the different IRAT cell reselection including a priority-based IRAT cell reselection procedure and a rank-based IRAT cell reselection procedure;
    performing the priority-based IRAT cell reselection procedure based on the priority list for reselecting to a base station of the first set of neighbor base stations when the UE is able to reselect to the first RAT; and
    performing the rank-based IRAT cell reselection procedure based on signal strength when the UE is unable to reselect to the first RAT, the rank-based IRAT cell reselection procedure being performed independent of the priority list.

2. The method of claim 1, wherein the performing the priority-based IRAT cell reselection procedure comprises:

reselecting a highest priority neighbor base station in the priority list that meets a threshold criteria, the highest priority neighbor base station operating on the first RAT.

3. The method of claim 1, wherein the performing the rank-based IRAT cell reselection procedure comprises:
   determining that a first signal strength associated with the serving base station meets a reselection threshold criteria; and
   determining a respective second signal strength associated with each of a second set of neighbor base stations upon determining that the first signal strength meets the reselection threshold criteria, the second set of neighbor base stations being different than the first set of neighbor base stations operating on the first RAT.

4. The method of claim 3, wherein the performing the rank-based IRAT cell reselection procedure comprises:
   ranking each neighbor base station in the second set of neighbor base stations based on the respective second signal strength for each neighbor base station; and
   reselecting to a highest ranked neighbor base station in the second set of neighbor base stations, the highest ranked neighbor base station operating on a second RAT different from the first RAT.

5. The method of claim 1, wherein the serving base station is operating on a lower priority RAT than the first RAT.

6. An apparatus for wireless communication of a user equipment (UE), comprising:
   means for receiving a priority list associated with preferred radio frequencies from a serving base station, each radio frequency of the preferred radio frequencies associated with a first set of neighbor base stations operating on a first radio access technology (RAT);
   means for determining if the UE is able to reselect to the first RAT;
   means for selecting between different inter-RAT (IRAT) cell reselection mechanisms based on whether the UE is able to reselect to the first RAT, the different IRAT cell reselection including a priority-based IRAT cell reselection procedure and a rank-based IRAT cell reselection procedure;
   means for performing the priority-based IRAT cell reselection procedure based on the priority list for reselecting to a base station of the first set of neighbor base stations when the UE is able to reselect to the first RAT; and
   means for performing the rank-based IRAT cell reselection procedure based on signal strength when the UE is unable to reselect to the first RAT, the rank-based IRAT cell reselection procedure being performed independent of the priority list.

7. The apparatus of claim 6, wherein the means for performing the priority-based IRAT cell reselection procedure is configured to:
   reselect a highest priority neighbor base station in the priority list that meets a threshold criteria, the highest priority neighbor base station operating on the first RAT.

8. The apparatus of claim 6, wherein the means for performing the rank-based IRAT cell reselection procedure is configured to:
   determine that a first signal strength associated with the serving base station meets a reselection threshold criteria; and
   determine a respective second signal strength associated with each of a second set of neighbor base stations upon determining that the first signal strength meets the reselection threshold criteria, the second set of neighbor base stations being different than the first set of neighbor base stations operating on the first RAT.

9. The apparatus of claim 8, wherein the means for performing the rank-based IRAT cell reselection procedure is configured to:
   rank each neighbor base station in the second set of neighbor base stations based on the respective second signal strength for each neighbor base station; and
   reselect to a highest ranked neighbor base station in the second set of neighbor base stations, the highest ranked neighbor base station operating on a second RAT different from the first RAT.

10. The apparatus of claim 6, wherein the serving base station is operating on a lower priority RAT than the first RAT.

11. An apparatus for wireless communication of a user equipment (UE), comprising:
    a memory; and
    at least one processor coupled to the memory and configured to:
       receive a priority list associated with preferred radio frequencies from a serving base station, each radio frequency of the preferred radio frequencies associated with a first set of neighbor base stations operating on a first radio access technology (RAT);
       determine if the UE is able to reselect to the first RAT;
       select between different inter-RAT (IRAT) cell reselection mechanisms based on whether the UE is able to reselect to the first RAT, the different IRAT cell reselection including a priority-based IRAT cell reselection procedure and a rank-based IRAT cell reselection procedure;
       perform the priority-based IRAT cell reselection procedure based on the priority list for reselecting to a base station of the first set of neighbor base stations when the UE is able to reselect to the first RAT; and
       perform the rank-based IRAT cell reselection procedure based on signal strength when the UE is unable to reselect to the first RAT, the rank-based IRAT cell reselection procedure being performed independent of the priority list.

12. The apparatus of claim 11, wherein the at least one processor is configured to perform the priority-based IRAT cell reselection procedure by:
    reselecting a highest priority neighbor base station in the priority list that meets a threshold criteria, the highest priority neighbor base station operating on the first RAT.

13. The apparatus of claim 11, wherein the at least one processor is configured to perform the rank-based IRAT cell reselection procedure by:
    determining that a first signal strength associated with the serving base station meets a reselection threshold criteria; and
    determining a respective second signal strength associated with each of a second set of neighbor base stations upon determining that the first signal strength meets the reselection threshold criteria, the second set of neighbor base stations being different than the first set of neighbor base stations operating on the first RAT.

14. The apparatus of claim 13, wherein the at least one processor is configured to perform the rank-based IRAT cell reselection procedure by:
    ranking each neighbor base station in the second set of neighbor base stations based on the respective second signal strength for each neighbor base station; and reselecting to a highest ranked neighbor base station in the second set of neighbor base stations, the highest ranked neighbor base station operating on a second RAT different from the first RAT.

15. The apparatus of claim 11, wherein the serving base station is operating on a lower priority RAT than the first RAT.

16. A computer-readable medium storing computer executable code of a user equipment (UE), comprising code to:
receive a priority list associated with preferred radio frequencies from a serving base station, each radio frequency of the preferred radio frequencies associated with a first set of neighbor base stations operating on a first radio access technology (RAT);
determine if the UE is able to reselect to the first RAT;
select between different inter-RAT (IRAT) cell reselection mechanisms based on whether the UE is able to reselect to the first RAT, the different IRAT cell reselection including a priority-based IRAT cell reselection procedure and a rank-based IRAT cell reselection procedure;
performing the priority-based IRAT cell reselection procedure based on the priority list for reselecting to a base station of the first set of neighbor base stations when the UE is able to reselect to the first RAT; and
perform the rank-based IRAT cell reselection procedure based on signal strength when the UE is unable to reselect to the first RAT, the rank-based IRAT cell reselection procedure being performed independent of the priority list.

17. The computer-readable medium of claim 16, wherein the code to perform the priority-based IRAT cell reselection procedure is configured to:
reselect a highest priority neighbor base station in the priority list that meets a threshold criteria, the highest priority neighbor base station operating on the first RAT.

18. The computer-readable medium of claim 16, wherein the code to perform the rank-based IRAT cell reselection procedure is configured to:
determine that a first signal strength associated with the serving base station meets a reselection threshold criteria; and
determine a respective second signal strength associated with each of a second set of neighbor base stations upon determining that the first signal strength meets the reselection threshold criteria, the second set of neighbor base stations being different than the first set of neighbor base stations operating on the first RAT.

19. The computer-readable medium of claim 18, wherein the code to perform the rank-based IRAT cell reselection procedure is configured to:
rank each neighbor base station in the second set of neighbor base stations based on the respective second signal strength for each neighbor base station; and
reselect to a highest ranked neighbor base station in the second set of neighbor base stations, the highest ranked neighbor base station operating on a second RAT different from the first RAT.

20. The computer-readable medium of claim 16, wherein the serving base station is operating on a lower priority RAT than the first RAT.

\* \* \* \* \*